United States Patent
Auer et al.

(10) Patent No.: US 12,532,394 B2
(45) Date of Patent: Jan. 20, 2026

(54) CONTROL SYSTEM AND METHOD FOR CONTROLLING A CURRENT SOURCE OF AN OPERATING DEVICE FOR LIGHTING MEANS, AN OPERATING DEVICE AND LUMINAIRE

(71) Applicant: Tridonic GmbH & Co KG, Dornbirn (AT)

(72) Inventors: Hans Auer, Dornbirn (AT); Fabio Romano, Altach (AT); Stefan Stark, Muntlix (AT)

(73) Assignee: Tridonic GmbH & Co KG, Dornbirn (AT)

( * ) Notice: Subject to any disclaimer, the term of this patent is extended or adjusted under 35 U.S.C. 154(b) by 38 days.

(21) Appl. No.: 18/710,220

(22) PCT Filed: Nov. 21, 2022

(86) PCT No.: PCT/EP2022/082533
§ 371 (c)(1),
(2) Date: May 15, 2024

(87) PCT Pub. No.: WO2023/089155
PCT Pub. Date: May 25, 2023

(65) Prior Publication Data
US 2024/0430998 A1    Dec. 26, 2024

(30) Foreign Application Priority Data
Nov. 19, 2021    (EP) ..................................... 21209220

(51) Int. Cl.
*H05B 45/34*    (2020.01)
*H02M 1/00*    (2007.01)
(Continued)

(52) U.S. Cl.
CPC .......... *H05B 45/34* (2020.01); *H02M 1/0022* (2021.05); *H05B 45/355* (2020.01); *H05B 45/3725* (2020.01); *H05B 47/183* (2024.01)

(58) Field of Classification Search
CPC .. H05B 45/34; H05B 45/355; H05B 45/3725; H05B 47/183; H02M 1/0022;
(Continued)

(56) References Cited

U.S. PATENT DOCUMENTS

| 2011/0221604 | A1 | 9/2011 | Johnson |
| 2012/0081017 | A1* | 4/2012 | Darshan ............... H05B 45/355 315/193 |

(Continued)

OTHER PUBLICATIONS

PCT/EP2022/082533, International Search Report and Written Opinion, dated Feb. 24, 2023, 6 pages.

*Primary Examiner* — Renan Luque
(74) *Attorney, Agent, or Firm* — Andrus Intellectual Property Law, LLP (57) ABSTRACT

The invention relates to a control system (1) for controlling a current source (4) of an operating device (10) for lighting means (5). The current source (4) is configured to provide a current (ILM) to the lighting means (5). The operating device (10) comprises a bus interface (8) electrically connectable to a digital bus (7) and a voltage supply circuit (3) for providing a supply voltage (V1) to electrically supply the bus interface (8) and the current source (4). The control system (1) is configured to perform a feedback control of the current (ILM) with regard to a reference current (Iref1, Iref2), and determine whether a communication via the bus interface (8) is present or not. Further the control system (1) is configured to perform a feedforward control of the current (ILM) based on an error (EV) between the supply voltage (V1) and a reference voltage (Vref) for the supply voltage (V1), by processing the error (Ev) using a first gain (G1) in (Continued)

case the control system (1) determines that the communication is present and a second gain (G2) in case the control system (1) determines that the communication is not present. The first gain (G1) is different to the second gain (G2).

15 Claims, 5 Drawing Sheets

(51) Int. Cl.
*H05B 45/355* (2020.01)
*H05B 45/3725* (2020.01)
*H05B 47/18* (2020.01)

(58) Field of Classification Search
CPC .. H02M 1/0016; H02M 1/007; H02M 1/4208; H02M 3/00
See application file for complete search history.

(56) References Cited

U.S. PATENT DOCUMENTS

2015/0195883 A1* 7/2015 Harris ................... H05B 47/19
 315/158
2015/0339970 A1 11/2015 Won \* cited by examiner

CONTROL SYSTEM AND METHOD FOR CONTROLLING A CURRENT SOURCE OF AN OPERATING DEVICE FOR LIGHTING MEANS, AN OPERATING DEVICE AND LUMINAIRE

CROSS REFERENCE TO RELATED APPLICATIONS

The present application is the U.S. national stage application of international application PCT/EP2022/082533 filed Nov. 21, 2022, which international application was published on May 25, 2023 as International Publication WO 2023/089155 A1. The international application claims priority to European Patent Application No. 21209220.9 filed Nov. 19, 2021.

BACKGROUND AND SUMMARY

The invention relates to a control system for controlling a current source of an operating device for lighting means; an operating device for lighting means, the operating device comprising such a control system; and a luminaire comprising such an operating device. Further, the invention relates to a method for controlling a current source of an operating device for lighting means.

Lighting means, such as light emitting diodes (LEDs), may be operated, i.e. electrically supplied, using an operating device for lighting means. The operating device may comprise a current source that is configured to provide a current to the lighting means. The operating device may further comprises a bus interface electrically connectable to a digital bus. In addition, the operating device may comprise a voltage supply circuit for providing a supply voltage to electrically supply the bus interface and the current source. Light emitted by the lighting means, i.e. a light emission of the lighting means, may be controlled by controlling the current and, thus, the electrical energy provided from the current source to the lighting means. The greater the current, for example an average current over time, the greater the amount of light (e.g. light intensity) that is emitted by the lighting means and vice versa.

When communication takes place via the bus interface, the bus interface draws electrical energy causing the supply voltage, provided to the bus interface for electrical energy supply of the bus interface, to change. Thus, during communication via the bus interface the supply voltage changes. As a result thereof, the current source (being supplied with the supply voltage) reacts to such a change of the supply voltage that results in a change of the current providable by the current source to the lighting means, which may cause a change of the light emission of the lighting means (e.g. light flicker). This change of the light emission of the lighting means may be visible for example as a change in the intensity or amount of light emitted by the lighting means. Thus, a luminance change of the light emission of the lighting means may occur due to a change of the current providable by the current source to the lighting means caused by a change of the supply voltage. The term "variation" may be used as a synonym for the term "change". Therefore, fluctuations of the supply voltage due to a tapping-off or drawing of the supply voltage for communication via the bus interface may be visible in the light output or light emission of the lighting means. Visible means visible to a person, i.e. the human eye.

Figure 1:
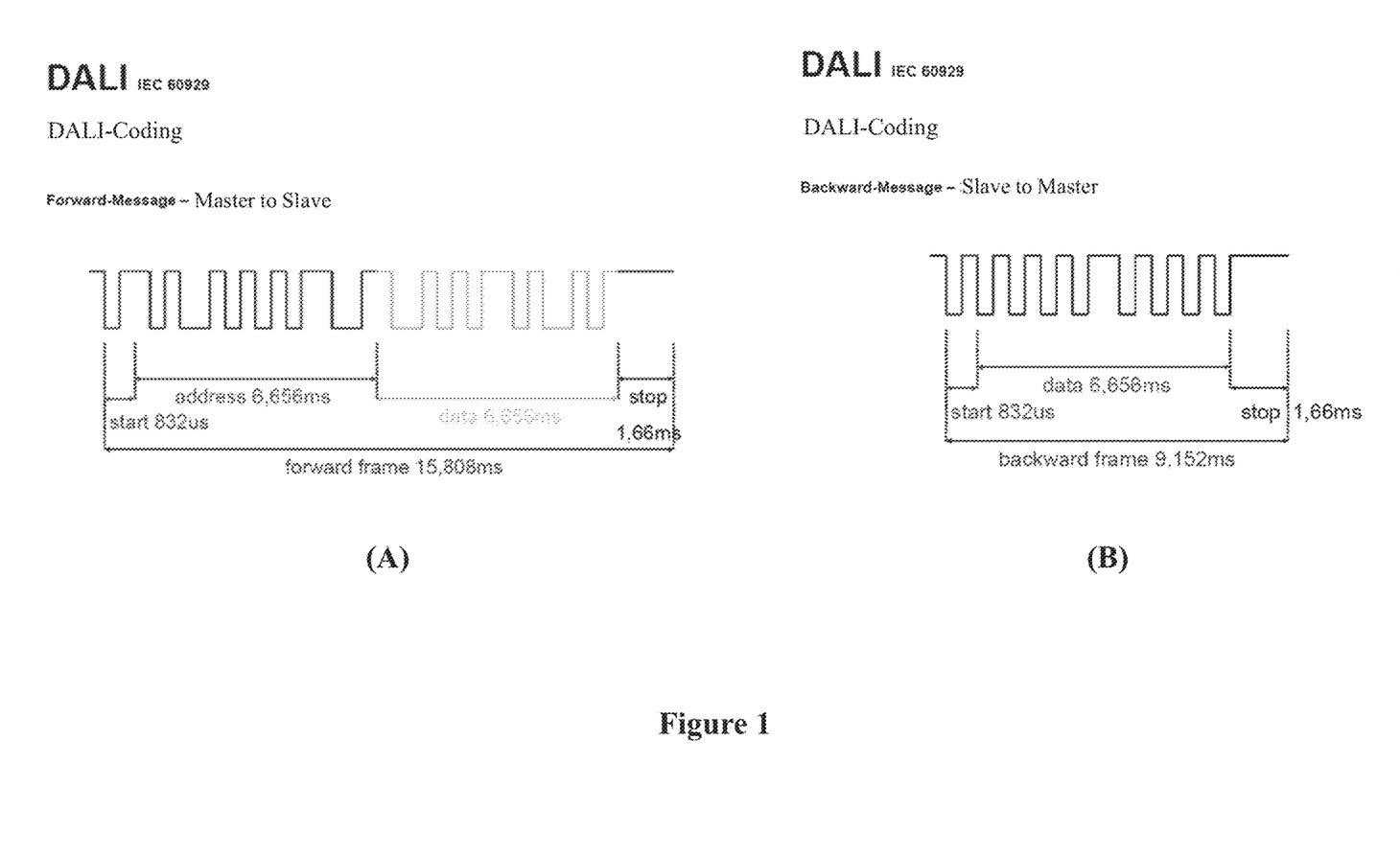
FIG. 1 shows an example of a DALI forward frame and an example of a DALI backward frame.

FIG. 1 shows an example of a DALI forward frame and an example of a DALI backward frame. In case the digital bus is a DALI or DALI-2 bus and, thus, the bus interface is a DALI or DALI-2 interface, such DALI forward frames and DALI backward frames may be received and transmitted via the bus interface. In particular, the so-called digital addressable lighting interface (DALI) standard provides two-way communications between luminaires (may be referred to as lighting fixtures), operating devices for lighting means (e.g. ballasts) and controllers. It is defined at least in IEC technical standards IEC 62386 and IEC 60929, which cover LED drivers and electronic ballasts used in AC supplies with voltages up to 1000 V and with operating frequencies of 50 Hz or 60 Hz. DALI uses Manchester-encoded 0 to 20 V signaling.

In particular, forward frames may be packets sent by a master via the bus to a slave, e.g. from a controller via the bus to an operating device. As exemplarily shown in FIG. 1 (A), a DALI forward frame may comprise one start bit, eight address bits, eight data bits and two stop bits. The bits are sent most significant bits (MSB) first. A backward frame is the response packet that may be send from a slave via the bus to a master, e.g. by the operating device via the bus back to the controller. As exemplarily shown in FIG. 1 (B), a DALI backward frame may comprise one start bit, eight data bits and two stop bits.

Figure 2:
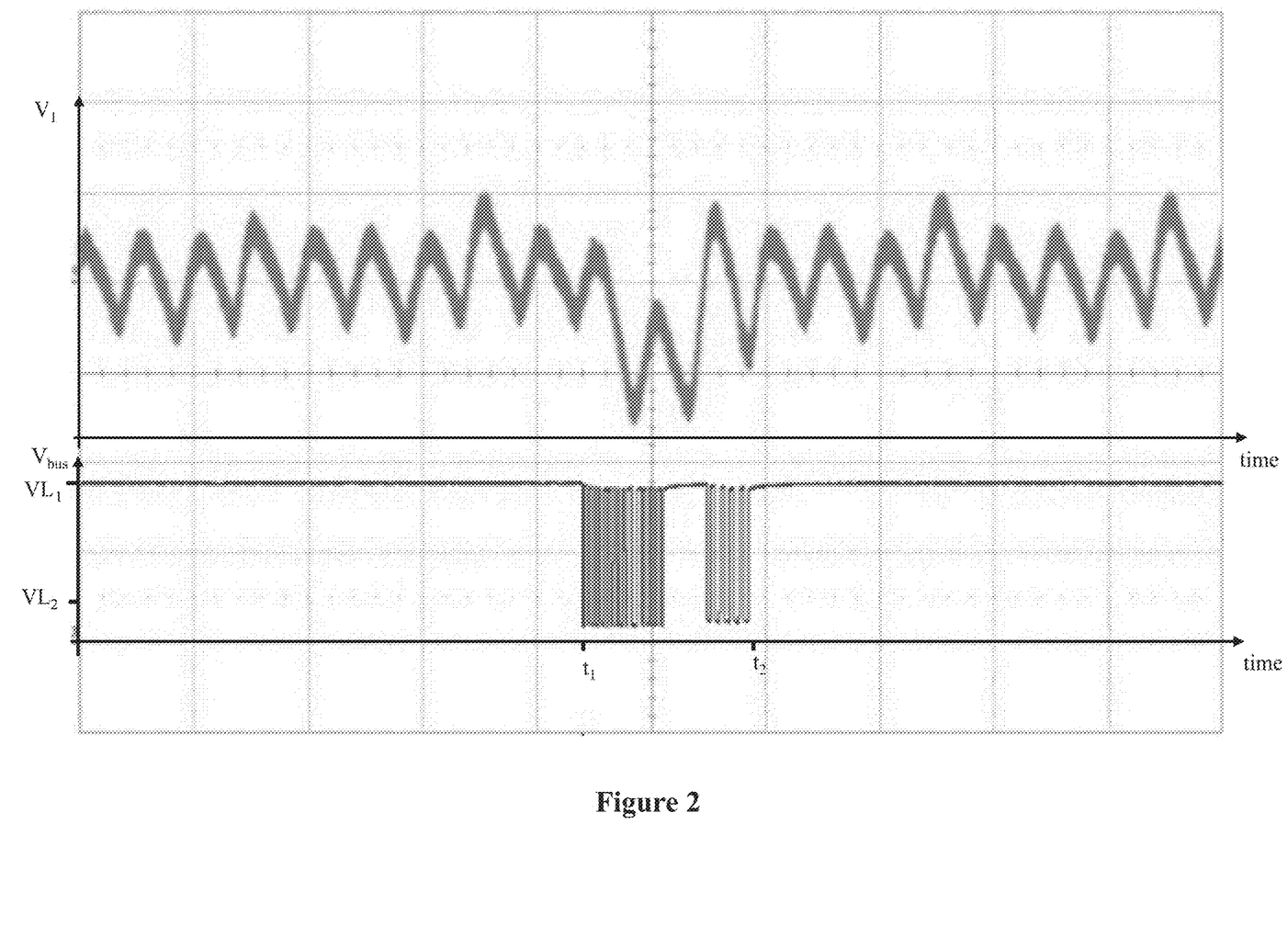
FIG. 2 shows over time an example of a supply voltage providable by a voltage supply circuit of an operating device for lighting means, wherein the voltage supply circuit is configured to electrically supply a bus interface and a current source of the operating device.

FIG. 2 exemplarily shows the supply voltage over time, which is providable by the voltage supply circuit of the operating device. In the example of FIG. 2, it is assumed that a digital bus is electrically connected to the bus interface. The voltage $V_{bus}$ of the digital bus is equal to a first voltage level $VL_1$ or is within a first voltage range when no communication is performed via the digital bus. As exemplarily shown in FIG. 2, for communicating, for example frames, via the digital bus, the voltage $V_{bus}$ of the digital bus is changed or decreased below a second voltage level $VL_2$. The second voltage level $VL_2$ is smaller than the first voltage level $VL_1$. The second voltage level shown in FIG. 2 is only by way of example. In particular, for the communication the voltage $V_{bus}$ of the digital bus is changed or altered between the first voltage level $VL_1$ and below the second voltage level $VL_2$. In other words, by altering or changing the voltage $V_{bus}$ of the digital bus, messages, e.g. in the form of bits or frames, may be communicated via the digital bus.

As shown in FIG. 2, between the time $t_1$ and $t_2$ communication takes place via the digital bus and, thus, via the bus interface of the operating device. Namely, during the time period between the time $t_1$ and $t_2$ the bus voltage $V_{bus}$ changes several times from the first voltage level $VL_1$ below the second voltage level $VL_2$. For example, during the time period between the time $t_1$ and $t_2$ DALI forward frames and/or DALI backward frames may be communicated via the digital bus. Before the time $t_1$ and after the time $t_2$ no communication takes place via the digital bus, because the digital bus has the first voltage level $VL_1$ (i.e. the voltage $V_{bus}$ of the digital bus equals to the first voltage level $VL_1$) before the time $t_1$ and after the time $t_2$.

As can be seen in the top graph of FIG. 2 showing the supply voltage $V_1$ providable by the voltage supply circuit of the operating device to the bus interface and current source of the operating device, the supply voltage $V_1$ changes, in particular decreases or drops, because of the communication via the digital bus. This causes a change of the current providable by the current source to the lighting means and, thus, a change of the light emission of the lighting means that is visible for a person, i.e. for the human eye.

Therefore, it is an object of the invention to provide a control system for controlling a current source of an operating device for lighting means, wherein the control system may overcome the above-described drawback. It is in particular an object of the invention to provide a control system for an operating device as described above that may overcome the above problem caused by communication via the bus interface of the operating device.

These and other objects, which become apparent upon reading the following description, are solved by the subject-matter of the independent claims. The dependent claims refer to preferred embodiments of the invention.

According to a first aspect of the invention, a control system for controlling a current source of an operating device for lighting means is provided. The lighting means are optionally at least one light emitting diode (LED). The current source is configured to provide a current to the lighting means. The operating device comprises a bus interface electrically connectable to a digital bus and a voltage supply circuit for providing a supply voltage to electrically supply the bus interface and the current source. The control system is configured to perform a feedback control of the current with regard to a reference current and determine whether a communication via the bus interface is present or not. Further, the control system is configured to perform a feedforward control of the current based on an error between the supply voltage and a reference voltage for the supply voltage, by processing the error using a first gain in case the control system determines that the communication is present and a second gain in case the control system determines that the communication is not present. The first gain is different to the second gain.

sing a feedforward control of the current based on an error between the supply voltage and the reference voltage for the supply voltage, wherein the error is processed with a different gain, depending on whether the communication via the bus interface is present or not, allows to counter the problem of a voltage drop of the supply voltage during communication via the bus interface. Namely, changing the gain may improve the reaction time to the supply voltage change and, thus, may prevent that a change of the supply voltage is transferred on the current, i.e. causes a change of the current providable by the current source. Thus, a reduced or no change in the current may be achieved, during a change of the supply voltage caused by communication via the bus interface. As a result, a change of the light emission that is visible to a person caused by a change of the current providable by the current source may be reduced or prevented during a communication via the bus interface.

In other words, a dynamic feedforward control of the current providable by the current source is proposed by the first aspect to suppress a disturbance by the supply voltage, caused by communication via the bus interface, on the current and, thus, light emission of the lighting means. The feedforward control is dynamic with regard to the processing of the error between the supply voltage and the reference voltage for the supply voltage using a first gain or a second gain depending on whether a communication via the bus interface is present or not. That is, the information on the supply voltage may be used to adapt the control of the current and, thus, the current source operation in order to counter supply voltage disturbances.

Since the control system may reduce or prevent the problem caused by a change of the supply voltage during a communication via the bus interface, no expensive and complex voltage supply circuit for the bus interface and the current source needs to be implemented. Thus, the control system keeps costs and complexity for implementing an operating device for lighting means low.

The current providable by the current source may be a DC current. The reference current may be a reference DC current. The control system may be configured to compute or determine the error between the supply voltage and the reference voltage for the supply voltage (in short referred to as reference voltage) by comparing the supply voltage with the reference voltage. The error between the supply voltage and the reference voltage indicates the difference between the supply voltage and the reference voltage.

The term "closed-loop control" may be used as a synonym for the term "feedback control". The term "open-loop control" may be used as a synonym for the term "feedforward control". Controlling the current source may be understood as controlling the current provided by the current source. The current source may be referred to as controllable current source.

The control system may be configured to control the voltage supply circuit and, thus, the supply voltage. The voltage supply circuit may be referred to as controllable voltage supply circuit.

The control system may be configured to perform the feedforward control of the current by changing the reference current using the error.

This allows influencing the feedback control of the current by the feedforward control of the current. Thus, information on the supply voltage, e.g. the error between the supply voltage and the reference voltage, may have an impact on the feedback control of the current. Therefore, in case the supply voltage drops or decreases due to communication via the bus interface, the control system may be configured to consider or determine this supply voltage change (drop or decrease) by adjusting the feedback control of the current. For example, the control system may be configured to change, using the error between the supply voltage and the reference voltage, the reference current used for the feedback control of the current.

Optionally, the control system is configured to perform the feedforward control of the current by multiplying the error with the first gain or the second gain, depending on whether the communication is present or not, and adding the result of the multiplication to the reference current.

Optionally, the first gain is greater than the second gain.

When the digital bus is electrically connected to the bus interface and has a first voltage level when no communication is performed via the digital bus, the control system may be configured to determine that the communication via the bus interface is started in case the control system determines that the first voltage level decreases below a second voltage level that is smaller than the first voltage level.

In other words, the control system may be configured to determine whether a communication via the bus interface is started by monitoring the voltage level of the digital bus (i.e. voltage level of the bus voltage). The control system may determine that no communication is present by determining or detecting that the digital bus has the first voltage level, i.e. the voltage level of the bus voltage equals to the first voltage level. The control system may determine that the communication via the bus interface is started by determining or detecting that the first voltage level decreases below the second voltage level, i.e. the voltage level of the bus voltage decreases below the second voltage level.

Optionally, the control system is configured to perform a feedback control of the supply voltage with regard to the reference voltage. The time constant of the feedback control of the supply voltage may be smaller in case the control system determines that the communication is present compared to the case when the control system determines that the communication is not present.

In other words, the time constant of the feedback control of the supply voltage may be faster during time periods for which the control system determines that the communication via the bus interface is present, compared to time periods for which the control system determines that the communication is not present.

Optionally, the control system is configured to use the first gain for the feedforward control until the control system determines that the communication is stopped.

In other words, the control system may be configured to maintain using the first gain for the feedforward control as long as the communication via the bus interface is present, i.e. as long as communication via the bus interface takes place.

Optionally, the control system is configured to determine that the communication is present in case the control system receives via the bus interface bus signals, or in case the control system controls the bus interface to transmit bus signals.

In other words, when the control system controls the bus interface to transmit bus signals, the control system already knows that communication via the bus interface is present and, thus, may perform the steps described for the case that the communication is present. In case the control system receives via the bus interface bus signals, the control system gets to know that communication via the bus interface is present and, thus, may perform the steps described for the case that the communication is present. In the case of passive communication via the bus interface, i.e. the control system being a receiver for the communication, the control system may determine that the communication via the bus interface is present with a delay compared to the case of active communication via the bus interface, i.e. the control system being a transmitter for the communication. Nevertheless, in both cases the control system may be configured to determine or detect the communication via the bus interface early enough in order to prevent or at least reduce the impact of the supply voltage change on the current providable by the current source and, thus, on the light emission of the lighting means.

Optionally, the control system comprises a microcontroller and a control integrated circuit (control IC). The microcontroller may be configured to determine whether the communication is present or not, and inform the control IC on whether the communication is present or not. The control IC may be configured to perform the feedforward control of the current based on the error between the supply voltage and the reference voltage for the supply voltage, by processing the error using the first gain in case the control IC is informed from the microcontroller that the communication is present and the second gain in case the control IC is informed from the microcontroller that no communication is present.

The control IC may be configured to compute or generate the first gain and second gain. Alternatively or additionally, the control IC may be configured to obtain the first gain and the second gain from a data storage, e.g. from a lookup table. For example, the first gain and the second gain may be stored in a lookup table so that the control IC obtains from the lookup table the first gain, when the control IC is informed by the microcontroller that the communication is present, and the second gain, when the control IC is informed by the microcontroller that the communication is not present.

The value of the first gain and the second gain may be changed by a user, optionally via the bus interface.

Optionally, the control system comprises a microcontroller and a control integrated circuit (control IC). The microcontroller may be configured to determine whether the communication is present or not, and provide to the control IC the first gain in case the communication is present and the second gain in case the communication is not present. The control IC may be configured to perform the feedforward control of the current based on the error between the supply voltage and the reference voltage for the supply voltage by processing the error using the first gain in case the control IC obtains the first gain from the microcontroller and the second gain in case the control IC obtains the second gain from the microcontroller.

The microcontroller may be configured to compute or generate the first gain and second gain. Alternatively or additionally, the microcontroller may be configured to obtain the first gain and the second gain from a data storage, e.g. from a lookup table. For example, the first gain and the second gain may be stored in a lookup table so that the microcontroller obtains from the lookup table the first gain, when it determines that the communication is present, and the second gain, when it determines that the communication is not present.

The value of the first gain and the second gain may be changed by a user, optionally via the bus interface.

The control IC may be an application specific integrated circuit (ASIC), or a field-programmable gate array (FPGA).

In order to achieve the control system according to the first aspect of the invention, some or all of the above described optional features may be combined with each other.

According to a second aspect of the invention, an operating device for lighting means is provided. Optionally, the lighting means are at least one light emitting diode (LED). The operating device comprises a current source configured to provide a current to the lighting means, a bus interface electrically connectable to a digital bus, a voltage supply circuit for providing a supply voltage to electrically supply the bus interface and the current source, and a control system according to the first aspect, as described above. The control system is configured to control the current source and determine whether a communication via the bus interface is present or not.

In case the operating device is for LEDs, the term "LED-driver" may be used as a synonym for the term "operating device". The operating device may be a ballast for lighting means, such as at least one LED.

The digital bus may be a wired bus. The digital bus may be a digital data bus. The bus may be a DALI-bus or DALI-2 bus, i.e. a bus according to the DALI ("Digital Addressable Lighting Interface") standard or DALI-2 standard. They are well known standards in the field of lighting, wherein DALI-2 is the follow up standard of DALI. The bus may any other known bus type, such as a Distributed Systems Interface (DSI) bus. Thus, the communication interface may be a DALI interface, a DALI-2 interface, a DSI interface etc.

Optionally, the control system is configured to receive via the bus interface bus signals, and control the bus interface to transmit bus signals.

The control system may be configured to receive and transmit via the bus interface messages, e.g. in the form of bits or frames. The control system may be configured to communicate via the bus interface or control communication via the bus interface.

The voltage supply circuit may be an actively switched voltage supply circuit with at least one switch. Optionally, the voltage supply circuit is an actively switched power factor correction (PFC) circuit with at least one switch. The control system may be configured to control switching of the at least one switch of the actively switched voltage supply circuit. The current source may be an actively switched DC/DC converter with at least one switch. The control system may be configured to control switching of the at least one switch of the actively switched DC/DC converter. The actively switched voltage supply circuit may comprise or may be an actively switched DC/DC converter with at least one switch.

Examples of an actively switched DC/DC converter comprise a buck-converter, boost-converter, buck-boost-converter, flyback converter, resonance converter etc.

The term "actively clocked DC/DC converter" may be used as a synonym for the term "actively switched DC/DC converter". The at least one switch may be or may comprise one or more transistors. Examples of transistors comprise field-effect transistors (FETs), e.g. metal-oxide semiconductor FETs (MOSFETs); bipolar junction transistors (BJTs); insulated gate bipolar transistors (IGBTs) etc.

The above description with regard to the control system according to the first aspect of the invention is also valid for the operating device according to the second aspect of the invention.

The operating device according to the second aspect of the invention achieves the same advantages as the control system according to the first aspect of the invention.

In order to achieve the operating device according to the second aspect of the invention, some or all of the above described optional features may be combined with each other.

According to a third aspect of the invention a luminaire is provided. The luminaire comprises an operating device according to the second aspect, as described above, and lighting means. Optionally, the lighting means are at least one light emitting diode, (LED). The operating device is configured to operate the lighting means.

The lighting means may comprise or be one or more lighting elements. The lighting means are not limited to being at least one LED (i.e. one or more LEDs) and, thus, may additionally or alternatively be at least one other lighting means type.

The above description with regard to the operating device according to the second aspect of the invention is also valid for the luminaire according to the third aspect of the invention.

The luminaire according to the third aspect of the invention achieves the same advantages as the control system according to the first aspect of the invention.

According to a fourth aspect of the invention a method for controlling a current source of an operating device for lighting means is provided. Optionally, the lighting means are at least one light emitting diode (LED). The current source is configured to provide a current to the lighting means. The operating device comprises a bus interface electrically connectable to a digital bus and a voltage supply circuit for providing a supply voltage to electrically supply the bus interface and the current source. The method comprises performing a feedback control of the current with regard to a reference current and determining whether a communication via the bus interface is present or not. The method further comprises performing a feedforward control of the current based on an error between the supply voltage and a reference voltage for the supply voltage by processing the error using a first gain in case it is determined that the communication is present and a second gain in case it is determined that no communication is present. The first gain is different to the second gain.

The method may comprise performing the feedforward control of the current by changing the reference current using the error.

Optionally, the method comprises performing the feedforward control of the current by multiplying the error with the first gain or the second gain, depending on whether the communication is present or not. Further, the method may comprise adding the result of the multiplication to the reference current.

Optionally, the first gain is greater than the second gain.

When the digital bus is electrically connected to the bus interface and has a first voltage level when no communication is performed via the digital bus, the method may comprise determining that the communication via the bus interface is started in case it is determined that the first voltage level decreases below a second voltage level that is smaller than the first voltage level.

Optionally, the method comprises performing a feedback control of the supply voltage with regard to the reference voltage. The time constant of the feedback control of the supply voltage may be smaller in case it is determined that the communication is present compared to the case when it is determined that the communication is not present.

Optionally, the method comprises using the first gain for the feedforward control until it is determined that the communication is stopped.

Optionally, the method comprises determining that the communication is present in case bus signals are received via the bus interface, or in case the bus interface is controlled to transmit bus signals.

Optionally, the control system comprises a microcontroller and a control integrated circuit (control IC). The method may comprise determining, by the microcontroller, whether the communication is present or not, and informing, by the microcontroller, the control IC on whether the communication is present or not. The method may comprise performing, by the control IC, the feedforward control of the current based on the error between the supply voltage and the reference voltage for the supply voltage by processing the error using the first gain in case the control IC is informed from the microcontroller that the communication is present and the second gain in case the control IC is informed from the microcontroller that no communication is present.

Optionally, the control system comprises a microcontroller and a control integrated circuit (control IC). The method may comprise determining, by the microcontroller, whether the communication is present or not, and providing, by the microcontroller, to the control IC the first gain in case the communication is present and the second gain in case the communication is not present. The method may comprise performing, by the control IC, the feedforward control of the current based on the error between the supply voltage and the reference voltage for the supply voltage by processing the error using the first gain in case the control IC obtains the first gain from the microcontroller and the second gain in case the control IC obtains the second gain from the microcontroller.

The above description with regard to the control system according to the first aspect of the invention is also valid for the method according to the fourth aspect of the invention.

The method according to the fourth aspect of the invention achieves the same advantages as the control system according to the first aspect of the invention.

In order to achieve the method according to the fourth aspect of the invention, some or all of the above described optional features may be combined with each other.

It has to be noted that all devices, elements, units and means described in the present application could be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities.

BRIEF DESCRIPTION OF THE DRAWINGS

In the following, the invention is described exemplarily with reference to the enclosed Figures, in which.

DETAILED DESCRIPTION OF THE DRAWINGS

In the Figures, corresponding elements have the same reference signs.

Figure 3:
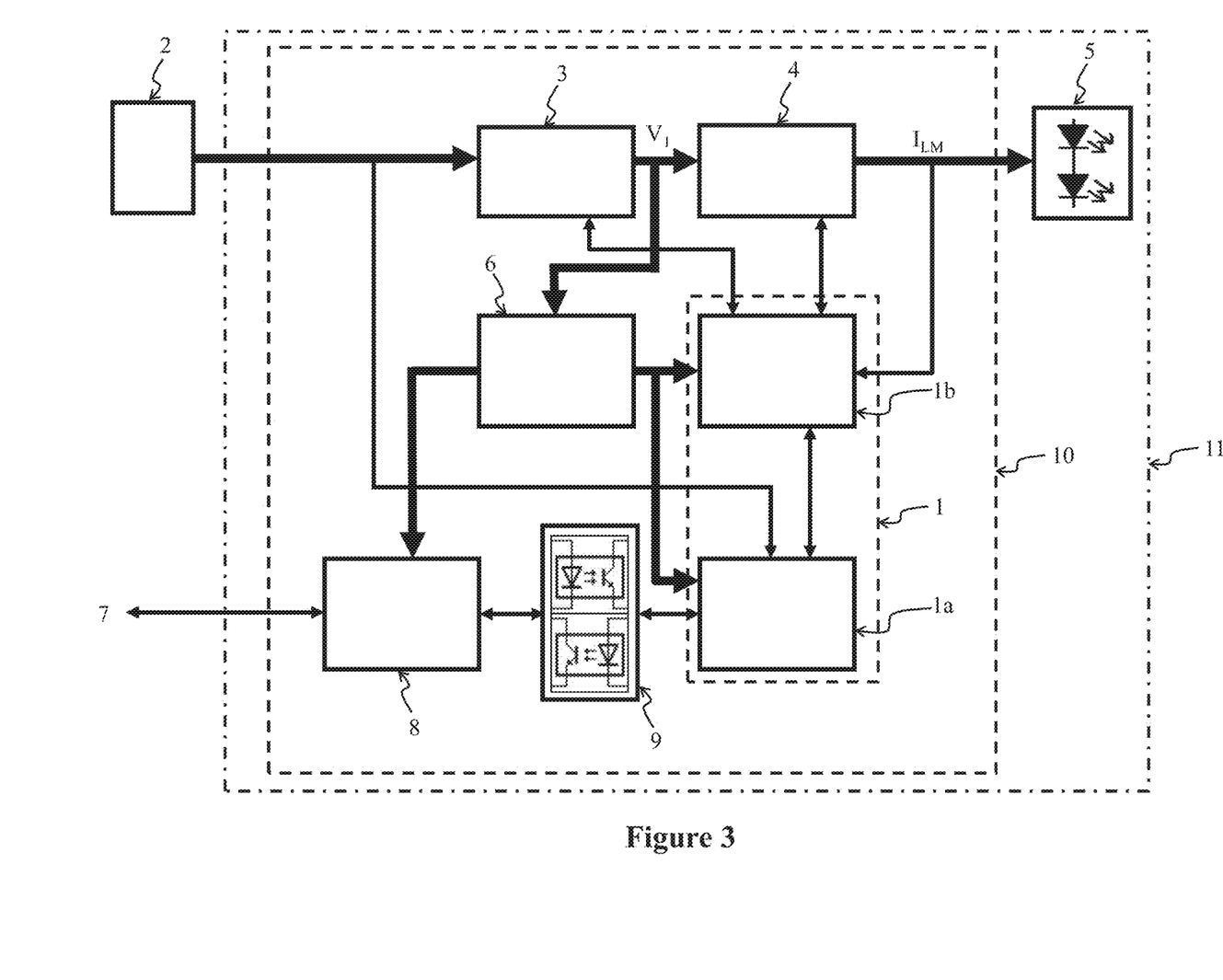
FIG. 3 shows a block diagram of a luminaire according to an embodiment of the invention.

FIG. 3 shows a block diagram of a luminaire according to an embodiment of the invention. The luminaire of FIG. 3 is an example of the luminaire according to the third aspect of the invention as described above.

As shown in FIG. 3, the luminaire 11 comprises an operating device 10 and lighting means 5, wherein the operating device is configured to operate the lighting means 5. The lighting means 5 may be one or more LEDs (i.e. at least one LED), as exemplarily shown in FIG. 3. The lighting means 5 may be alternatively or additionally any other lighting means type. The operating device 10 is an example of the operating device according to the second aspect. Thus, the description with regard to the operating device according to the second aspect is correspondingly valid for the operating device 10.

As shown in FIG. 3, the operating device 10 comprises a current source 4 configured to provide a current ILM to the lighting means 5, a control system 1, a bus interface 8 electrically connectable to a digital bus 7, and a voltage supply circuit 3 for providing a supply voltage $V_1$ to electrically supply the bus interface 8 and the current source 4.

The control system 1 is configured to control the current source 4 and, thus, control the current $I_{LM}$ providable by the current source 4. The control system 1 may be configured to control the voltage supply circuit 3 and, thus, the supply voltage $V_1$. The control system 1 is an example of the control system of the first aspect. Thus, the above description with regard to the control system according to the first aspect is correspondingly valid for the control system 1. The control system 1 may comprise a microcontroller 1a and a control IC 1b. The control IC 1b may be an ASIC or an FPGA. The microcontroller 1a and the control IC 1b may be configured to perform the functions of the control system 1. In particular, the microcontroller 1a and the control IC 1b may be configured to perform the functions of the control system 1 as outlined below with regard to FIGS. 3 and 4.

Optionally, the current source 4 may be an actively switched DC/DC converter with at least one switch, and the control system 1, in particular the control IC 1b, is configured to control switching of the at least one switch.

The voltage supply circuit 3 may be an actively switched voltage supply circuit with at least one switch. The voltage supply circuit 3 may be configured to perform a power factor correction (PFC) function. Optionally, the voltage supply circuit 3 is an actively switched PFC circuit with at least one switch. The control system 1, in particular the control IC 1b, may be configured to control switching of the at least one switch of the actively switched voltage supply circuit. The actively switched voltage supply circuit may comprise or may be an actively switched DC/DC converter with at least one switch.

Examples of an actively switched DC/DC converter comprise a buck-converter, boost-converter, buck-boost-converter, flyback converter, resonance converter etc. The term "actively clocked DC/DC converter" may be used as a synonym for the term "actively switched DC/DC converter". The at least one switch may be or may comprise one or more transistors. Examples of transistors comprise field-effect transistors (FETs), e.g. metal-oxide semiconductor FETs (MOSFETs); bipolar junction transistors (BJTs); insulated gate bipolar transistors (IGBTs) etc.

The operating device 10 may comprise a measurement unit for measuring the current $I_{LM}$ providable by the current source 7 (not shown in FIG. 3). The measurement unit may comprise or may be a shunt resistor. The control system 1, in particular the control IC 1b, may be configured to obtain the measurement of the current $I_{LM}$ and use it for a feedback control of the current $I_{LM}$. The operating device 10 may comprise a measurement unit for measuring the supply voltage $V_1$ providable by the voltage supply circuit 3 (not shown in FIG. 3). The measurement unit may comprise or may be a voltage divider and/or magnetically coupled inductors. The control system 1, in particular the control IC 1b, may be configured to obtain the measurement of the supply voltage $V_1$ and use it for a feedforward control of the current $I_{LM}$, as exemplarily outlined below with regard to FIG. 4.

Optionally, the operating device 10 may comprise a rectification and/or filter circuit (not shown in FIG. 3). This rectification and/or filter circuit may comprise filter means (e.g. EMI filter) and/or rectifier means. The rectification and/or filter circuit may be implemented in any way known in the art. The optional rectification and/or filter circuit, the voltage supply circuit 3 and the current source 4 may form an electrical energy supply circuit for providing electrical energy from an external electrical energy source 2, e.g. mains, to the lighting means 5. The voltage supply circuit 3 may be electrically supplied from the external electrical energy source 2 (in case the optional rectification and/or filter circuit is not present) or from the optional rectification and/or filter circuit. The optional rectification and/or filter circuit may be supplied from the external electrical energy source 2.

The operating device 10 may comprise the bus interface 8 for communication to outside the operating device 10. The control system 1, in particular the microcontroller 1a, may be configured to communicate via the communication interface 8.

The communication interface 8 is configured for being electrically connected to a digital bus 7. The digital bus 7 may be a wired bus. The digital bus 7 may be a digital data bus. The bus 7 may be part of the luminaire 11. The bus may be a DALI-bus or DALI-2 bus, i.e. a bus according to the DALI ("Digital Addressable Lighting Interface") standard or DALI-2 standard. They are well known standards in the field of lighting, wherein DALI-2 is the follow up standard of DALI. The bus 7 may be any other known bus type, such as a Distributed Systems Interface (DSI) bus. Thus, the communication interface 8 may be a DALI interface, a DALI-2 interface, a DSI interface etc. The digital bus 7 may have a first voltage level when no communication is performed via the digital bus 7. That is, the voltage of the digital bus 7 may have the first voltage level when no communication is performed via the digital bus 7, i.e. when the bus 7 is in rest. When a communication is performed via the digital bus 7, the voltage of the bus 7 may change between the first voltage level to voltages below a second voltage level that is lower than the first voltage level. The control system 1, in particular the microcontroller 1a, may be configured to determine that the communication via the bus interface 8 is started in case the control system 1, in particular the microcontroller 1a, determines that the first voltage level of the bus decreases below the second voltage level that is smaller than the first voltage level.

The control system 1, in particular the microcontroller 1a, may be configured to determine that the communication is present in case the control system 1, in particular the microcontroller 1a, receives via the bus interface 8 bus signals, or in case the control system 1, in particular the microcontroller 1a, controls the bus interface 8 to transmit bus signals.

As shown in FIG. 3, the control system 1, in particular the microcontroller 1a, may optionally be electrically connected to the communication interface 8 via an galvanic isolation circuit 9. For example, the isolation circuit 9 may comprise one or more optocouplers, one or more transformers etc. The control system 1, in particular the microcontroller 1a, may be configured to communicate via the communication interface 8 with outside the operating device 10, i.e. with an external unit outside the operating device 10. Outside the operating device 10 may optionally mean outside the luminaire 11.

Optionally, the operating device 10 may comprise a low voltage power supply 6 for electrically supplying the control system 1, in particular the microcontroller 1a and the control IC 1b, and the communication interface 8. The low voltage power supply 9 may be electrically supplied with the supply voltage $V_1$ providable by the voltage supply circuit 3. Thus, in case communication takes place via the bus interface 8, the low voltage power supply 6 may tap-off or draw more energy for the communication. This result in a drop or decrease of the supply voltage $V_1$. As described below with regard to FIGS. 3 and 4, the control system 1 is configured to adapt the control of the current source 4 and, thus, of the current $I_{LM}$ provided to the lighting means 5 in order to prevent or reduce an impact of the supply voltage $V_1$ change on the light emission of the lighting means 5.

Figure 4:
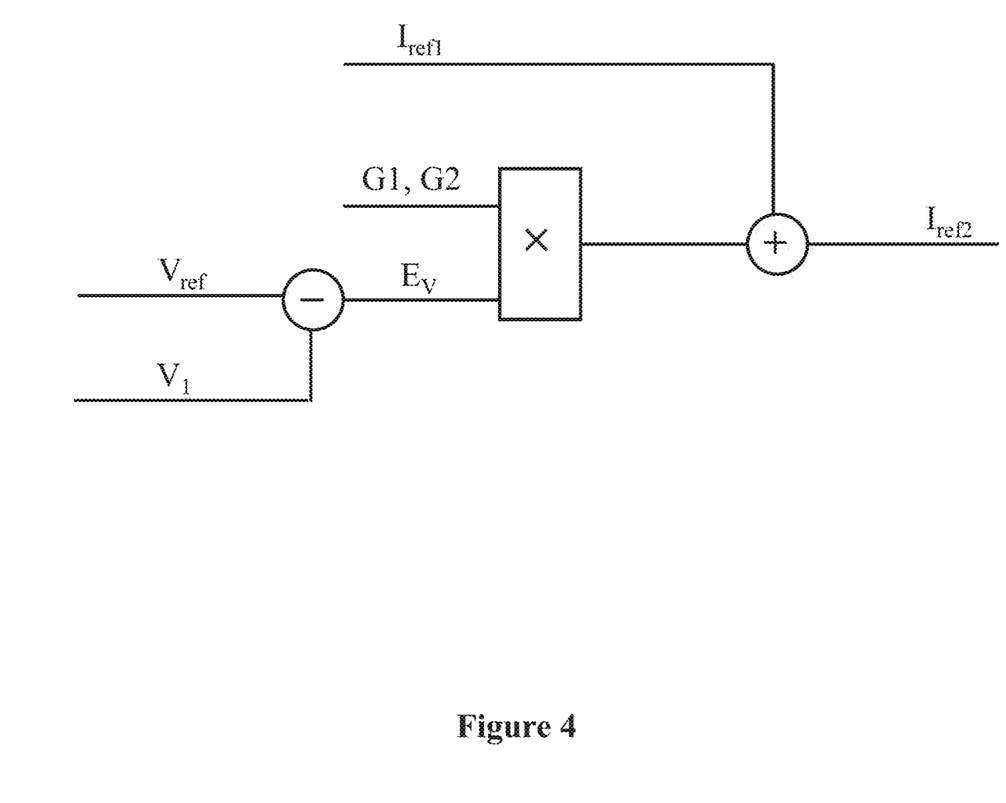
FIG. 4 shows a block diagram for describing the function of a control system according to an embodiment of the invention.

For further details of the control system 1 of FIG. 3 reference is made to the above description of the control system according to the first aspect of the invention and the following description of FIGS. 3 and 4. For further details of the operating device 10 of FIG. 3 reference is made to the above description of the operating device according to the second aspect of the invention. For further details of the luminaire 11 of FIG. 3 reference is made to the above description of the luminaire according to the third aspect of the invention.

FIG. 4 shows a block diagram for describing a function of a control system according to an embodiment of the invention. In particular, FIG. 4 shows a block diagram for describing a function of the control system 1 of FIG. 3.

The control system 1 is configured to perform a feedback control of the current $I_{LM}$ with regard to a reference current $I_{ref1}$. As shown in FIG. 4, the control system 1 is configured to perform a feedforward control of the current $I_{LM}$ based on an error $E_V$ between the supply voltage $V_1$ and a reference voltage $V_{ref}$ for the supply voltage $V_1$. For this, the control system 1 may be configured to process the error $E_V$ using a first gain G1 in case the control system 1 determines that the communication via the bus interface 8 is present and a second gain G2 in case the control system 1 determines that the communication is not present. The first gain G1 and the second gain G2 are different to each other. The first gain G1 may be greater than the second gain G2. The control system 1 may be configured to use the first gain G1 for the feedforward control until the control system 1 determines that the communication via the bus interface 8 is stopped.

As shown in FIG. 4, the control system 1 may be configured to compute or generate the error $E_V$ by comparing the supply voltage $V_1$ and the reference voltage $V_{ref}$ with each other. The control system 1 may be configured to perform the feedforward control of the current $I_{LM}$ by changing the reference current $I_{ref1}$ (for the feedback control of the current $I_{LM}$) using the error $E_V$. In particular, the control system 1 may be configured to perform the feedforward control of the current $I_{LM}$ by multiplying the error $E_V$ with the first gain G1 or the second gain G2, depending on whether the communication via the bus interface 8 is present or not, and adding the result of the multiplication to the reference current $I_{ref1}$.

In other words, for performing the feedforward control, the control system 1 may be configured to multiply the error $E_V$ (between the supply voltage $V_1$ and the reference voltage $V_{ref}$) with the first gain G1 in case the communication via the bus interface 8 is present or with the second gain G2 in case the communication is not present, and add the result of the multiplication to the reference current $I_{ref1}$. Thus, the feedforward control may be configured to generate a second reference current $I_{ref2}$ by adding the result of the aforementioned multiplication to the reference current $I_{ref1}$ (first reference current). The reference current $I_{ref1}$ indicates the desired value for the current $I_{LM}$ in order to achieve a desired light emission by the lighting means. The second reference current $I_{ref2}$ corresponds to the reference current $I_{ref1}$ that is changed or altered by the feedforward control using the supply voltage $V_1$ as an input. The control system 1 is configured to use the second reference current $I_{ref2}$ for the feedback control of the current $I_{LM}$. For this feedback control a measurement of the current $I_{LM}$ is used and, thus, provided to the control system 1.

Optionally, the control system is configured to perform a feedback control of the supply voltage $V_1$ with regard to the reference voltage (not shown in FIG. 4). The time constant of the feedback control of the supply voltage $V_1$ is smaller in case the control system 1 determines that the communication via the bus interface 8 is present compared to the case when the control system 1 determines that the communication is not present.

According to an alternative, the microcontroller 1a of the control system 1 may be configured to determine whether the communication via the bus interface 8 is present or not, and inform the control IC 1b on whether the communication is present or not. The control IC 1b may be configured to process the error $E_v$ using the first gain G1 in case the control IC 1b is informed from the microcontroller 1a that the communication is present and the second gain G2 in case the control IC 1b is informed from the microcontroller 1a that no communication is present.

According to another alternative, the microcontroller 1a of the control system 1 may be configured to determine whether the communication via the bus interface 8 is present or not, and provide to the control IC 1b the first gain G1 in case the communication is present and the second gain G2 in case the communication is not present. This is exemplarily shown in FIG. 5. The control IC 1b may be configured to process the error $E_V$ using the first gain G1 in case the control IC 1b obtains the first gain G1 from the microcontroller 1a and the second gain G2 in case the control IC 1b obtains the second gain G2 from the microcontroller 1a.

Figure 5:
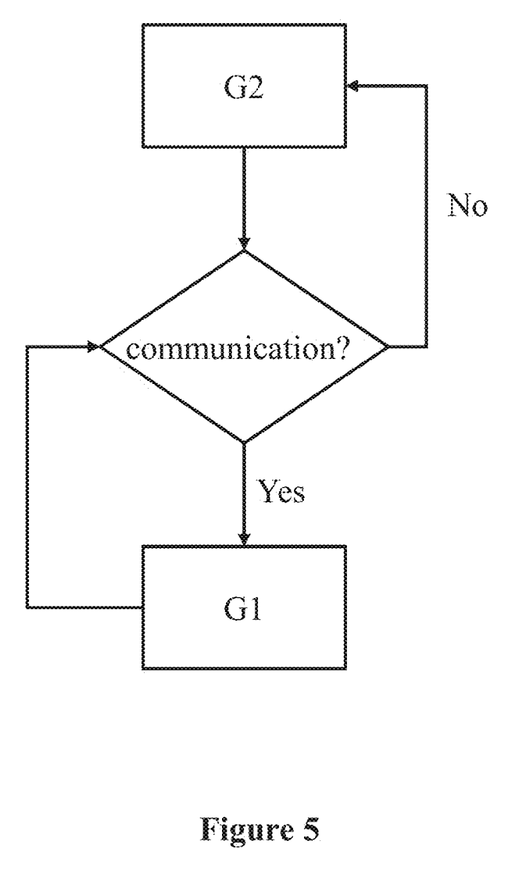
FIG. 5 shows a block diagram for describing the function of a control system according to an embodiment of the invention.

Thus, the microcontroller 1a of the control system 1 may be configured to determine whether the communication via the bus interface 8 is present or not. The microcontroller 1a may provide information on whether the communication is present or not to the control IC 1b; or the microcontroller 1a may provide the first gain G1 or second gain G2 (depending on whether the communication is present of not) to the control IC 1b for the feedforward control of the current $I_{LM}$.

The control IC 1b may be configured to perform the feedforward control and the feedback control of the current $I_{LM}$, as outlined above. Optionally, the control IC 1b may be configured to perform a feedback control of the supply voltage $V_1$.

FIG. 5 shows a block diagram for describing a function of a control system according to an embodiment of the invention. In particular, FIG. 5 shows a block diagram for describing a function of the control system 1 of FIG. 3.

As shown in FIG. 5, the microcontroller 1a of the control system 1 may be configured to determine whether the communication via the bus interface 8 is present or not, and provide to the control IC 1b the first gain G1 in case the communication is present (YES) and the second gain G2 in case the communication is not present (NO).

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A control system (1) for controlling a current source (4) of an operating device (10) for lighting means (5), wherein
the current source (4) is configured to provide a current (ILM) to the lighting means (5), and
the operating device (10) comprises a bus interface (8) electrically connectable to a digital bus (7) and a voltage supply circuit (3) for providing a supply voltage ($V_1$) to electrically supply the bus interface (8) and the current source (4); wherein
the control system (1) is configured to
perform a feedback control of the current ($I_{LM}$) with regard to a reference current ($T_{ref1}$, $I_{ref2}$),
determine whether a communication via the bus interface (8) is present or not, perform a feedforward control of the current ($I_{LM}$) based on an error ($E_v$) between the supply voltage ($V_1$) and a reference voltage ($V_{ref}$) for the supply voltage ($V_1$), by processing the error ($E_v$) using
a first gain (G1) in case the control system (1) determines that the communication is present and
a second gain (G2) in case the control system (1) determines that the communication is not present,
wherein the first gain (G1) is different to the second gain (G2).

2. The control system (1) according to claim 1, wherein the control system (1) is configured to perform the feedforward control of the current ($I_{LM}$) by changing the reference current ($I_{ref1}$) using the error ($E_V$).

3. The control system (1) according to claim 1, wherein the control system (1) is configured to perform the feedforward control of the current ($I_{LM}$) by
multiplying the error ($E_V$) with the first gain (G1) or the second gain (G2), depending on whether the communication is present or not, and adding the result of the multiplication to the reference current ($I_{ref1}$).

4. The control system according to claim 1, wherein the first gain (G1) is greater than the second gain (G2).

5. The control system (1) according to claim 1, when the digital bus (7) is electrically connected to the bus interface (8) and has a first voltage level when no communication is performed via the digital bus (7),
the control system (1) is configured to determine that the communication via the bus interface (8) is started in case the control system (1) determines that the first voltage level decreases below a second voltage level that is smaller than the first voltage level.

6. The control system (1) according to claim 1, wherein the control system (1) is configured to perform a feedback control of the supply voltage ($V_1$) with regard to the reference voltage ($V_{ref}$); and
the time constant of the feedback control of the supply voltage ($V_1$) is smaller in case the control system (1) determines that the communication is present compared to the case when the control system (1) determines that the communication is not present.

7. The control system (1) according to claim 1, wherein the control system (1) is configured to use the first gain (G1) for the feedforward control until the control system (1) determines that the communication is stopped.

8. The control system (1) according to claim 1, wherein the control system (1) is configured to determine that the communication is present in case the control system (1) receives via the bus interface (8) bus signals, or the control system (1) controls the bus interface (8) to transmit bus signals.

9. The control system (1) according to claim 1, wherein the control system (1) comprises a microcontroller (1a) and a control integrated circuit (1b), control IC;
the microcontroller (1a) is configured to determine whether the communication is present or not, and inform the control IC (1b) on whether the communication is present or not; and
the control IC (1b) is configured to
perform the feedforward control of the current ($I_{LM}$) based on the error ($E_V$) between the supply voltage ($V_1$) and the reference voltage ($V_{ref}$) for the supply voltage ($V_1$), by processing the error ($E_V$) using
the first gain (G1) in case the control IC (1b) is informed from the microcontroller (1a) that the communication is present and the second gain (G2) in case the control IC (1b) is informed from the microcontroller (1a) that no communication is present.

10. The control system (1) according to claim 1, wherein the control system (1) comprises a microcontroller (1a) and a control integrated circuit (1b), control IC;
the microcontroller (1a) is configured to
determine whether the communication is present or not, and
provide to the control IC (1b) the first gain (G1) in case the communication is present and the second gain (G2) in case the communication is not present; and
the control IC (1b) is configured to
perform the feedforward control of the current ($I_{LM}$) based on the error ($E_V$) between the supply voltage ($V_1$) and the reference voltage ($V_{ref}$) for the supply voltage ($V_1$) by processing the error ($E_V$) using
the first gain (G1) in case the control IC (1b) obtains the first gain (G1) from the microcontroller (1a) and
the second gain (G2) in case the control IC (1b) obtains the second gain (G2) from the microcontroller (1a).

11. An operating device (10) for lighting means (5), wherein the operating device (10) comprises
a current source (4) configured to provide a current ($I_{LM}$) to the lighting means (5),
a bus interface (8) electrically connectable to a digital bus (7),
a voltage supply circuit (3) for providing a supply voltage ($V_1$) to electrically supply the bus interface (8) and the current source (4), and
a control system (1) according to claim 1; wherein
the control system (1) is configured to control the current source (4) and determine whether
a communication via the bus interface (8) is present or not.

12. The operating device (10) according to claim 11, wherein the control system (1) is configured to
receive via the bus interface (8) bus signals, and
control the bus interface (8) to transmit bus signals.

13. The operating device (10) according to claim 11,
wherein the voltage supply circuit (3) is an actively switched voltage supply circuit, with at least one switch and
the control system (1) is configured to control switching of the at least one switch of the actively switched voltage supply circuit; and/or
wherein the current source (4) is an actively switched DC/DC converter with at least one switch, and
the control system (1) is configured to control switching of the at least one switch of the actively switched DC/DC converter.

14. A luminaire (11) comprising,
an operating device (10) according to claim 11, and
lighting means (5) wherein
the operating device (10) is configured to operate the lighting means (5).

15. A method for controlling a current source (4) of an operating device
(10) for lighting means (5), wherein the current source (4) is configured to provide a current ($I_{LM}$) to the lighting means (5), and
the operating device (10) comprises a bus interface (8) electrically connectable to a digital bus (7) and a voltage supply circuit (3) for providing a supply voltage (V1) to electrically supply the bus interface (8) and the current source (4); wherein
the method comprises
performing a feedback control of the current ($I_{LM}$) with regard to a reference current ($I_{ref1}$, $I_{ref2}$),
determining whether a communication via the bus interface (8) is present or not, performing a feedforward control of the current ($I_{LM}$) based on an error ($E_V$) between the supply voltage (V1) and a reference voltage ($V_{ref}$) for the supply voltage ($V_1$) by processing the error ($E_V$) using
a first gain (G1) in case it is determined that the communication is present and
a second gain (G2) in case it is determined that no communication is present,
wherein the first gain (G1) is different to the second gain (G2).

* * * * *